2,946,790

TETRAHYDROPYRIDAZINIUM COMPOUNDS

Bernard Rudner, Pittsburgh, Pa., and Mary Jo Woods, Catonsville, Md., assignors to W. R. Grace & Co., New York, N.Y., a corporation of Connecticut No Drawing. Filed Mar. 20, 1959, Ser. No. 800,624

6 Claims. (Cl. 260—250)

This invention relates to a novel process for the preparation of $\Delta^2$-tetrahydropyridazinium compounds and to the novel compounds produced thereby.

These heterocyclic compounds, unavailable prior to our discovery, have been found to possess analgesic and other desirable pharmacological properties combined with low toxicity.

It is, therefore, an object of the present invention to provide a new class of pyridazinium salts useful as analgesics as well as providing a process for their preparation.

In accordance with the present invention, we have made available tetrahydropyridazinium compounds having the generic formula:

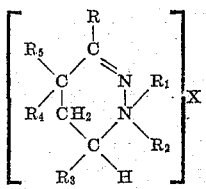

In the above formula, R, $R_1$ and $R_2$ are lower alkyl radicals; $R_3$, $R_4$ and $R_5$ are independently selected from the group consisting of hydrogen, lower alkyl, phenyl, lower alkyl phenyl and halo phenyl; and X is an anion.

Our novel compounds are made by the action of chloramine on substituted gamma keto tertiary amines having the general formula $RCOCR_5R_4CH_2CHR_3NR_2R_1$. In preparing the compounds of the present invention, it is usually preferable to contact chloramine with a solution of the appropriate gamma keto tertiary amine, allow the reaction to proceed until the desired quantity of chloramine is consumed and then isolate and purify the resultant $\Delta^2$-tetrahydropyridazinium chloride by standard laboratory techniques. While chloramine is most advantageously prepared as a gaseous chloramine-ammonia mixture obtained from a generator constructed according to the teachings of Sisler et al., U.S. Patent 2,710,248, other methods are equally adaptable for the purpose of the present invention. For instance, chloramine can be made by reacting chlorine with an excess of ammonia in carbon tetrachloride or similar halogenated hydrocarbon solvents under controlled conditions of mixing at low temperatures. Such a process is fully described in U.S. Patent 2,678,258 to John F. Haller. When preformed chloramine is used and good absorption is required for efficient reaction, it has been found desirable to bubble chloramine through a long column of a solution comprising the tertiary amine dissolved in relatively cheap inert solvent. By inert solvent it is meant a solvent unreactive under the conditions of the reaction. Solvents which serve this purpose include hydrocarbons, e.g., heptane, cyclohexane, benzene, xylene and the like; ethers, e.g., diethyl ether, diamyl ether, dioxane and anisole; amides, e.g., dimethylformamide and dimethylacetamide; halohydrocarbons, e.g., chloroform, carbon tetrachloride, trichloroethylene and chlorobenzene; alcohols, e.g., methanol, ethanol and 2-propanol.

It is obvious that not all of the novel pyridazinium compounds of our invention are capable of being prepared directly as described above. In order to provide the other useful salts of the present invention, it is necessary to prepare the compounds containing anions other than chloride by metathesis. Many of the anions can be introduced by mixing aqueous solutions of the pyridazinium chloride with appropriate reagents. More often than not, the desired product precipitates directly as the reaction progresses. This is the case where the new salt being formed is less soluble or insoluble in water. Other metathetical approaches are available and the method selected depends on experimental convenience, costs of reagents and the differences in physical properties between the product and the starting material to be utilized in their separation. Reaction of a pyridazinium halide with a soluble silver salt, such as silver nitrate, results in the precipitation of silver halide and the formation of the pyridazinium nitrate. In an analogous manner, treatment of the sulfate with a soluble barium salt results in the precipitation of barium sulfate and conversion to the anion of the barium salt. Quite often the appropriate reactants are heated together in the absence of a solvent and the product isolated by standard laboratory techniques. Another approach independent of the formation of an insoluble solid, is to react the halide with an excess of the desired anion as its acid; hydrogen halide is evolved as the new salt is formed. When it is necessary to prepare a very soluble salt, the reaction of the pyridazinium hydroxide with equivalent amounts of the appropriate acid may be utilized; this approach is also used for the preparation of very pure compounds. (Subjecting a pyridazinium halide to the action of moist silver oxide will give the pyridazinium hydroxide.)

Normally, the choice of the anion is of minor consequence since the primary activity of our novel compounds resides in the cation. The salts obtained by variation of the anion may in certain cases have special advantages due to solubility, ease of dispersibility or the like. But these considerations are all subsidiary to the characteristics of the cation which are independent of the character of the anion and hence all anions are considered to be equivalent for the purposes of the present invention.

As can be seen from the discussion presented above, the heart of our invention is the discovery that chloramine reacts with appropriately substituted gamma keto tertiary amines to form $\Delta^2$-tetrahydropyridazinium chlorides. We will not speculate about the mechanism of the formative reaction except to say that it appears to be favored by the formation of a stable six-membered ring system.

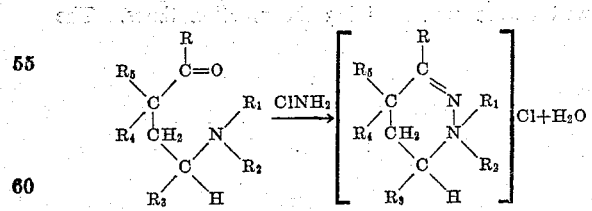

Our novel compounds have been found to be useful as analgesics and to have low toxicity. The scope and utility of our invention is further illustrated by the following examples:

Example I

A chloroform solution containing 25 g. of methadone hydrochloride (6-dimethylamino,4,4-diphenyl-3-heptanone hydrochloride) was converted to the free amine by treatment with aqueous sodium carbonate. After separation and drying of the 500 ml. organic layer, chloramine prepared by the gas phase reaction of 7 g. of chlorine with excess ammonia was passed into the chloroform solution over a period of about 50 minutes. The reaction mixture was filtered to remove the ammonium chloride present and the product was recovered by evaporation of the filtrate. Recrystallization of the hygroscopic residue from benzene gave white crystals of 1,1,6-trimethyl-3-ethyl-4,4-diphenyl-$\Delta^2$-tetrahydropyridazinium chloride. The pure product melted at 167–168° C. and analyzed as follows: %C, 72.9; %H, 8.00; %N, 8.13; and %Cl, 10.1. Calculated for $C_{21}H_{27}N_2Cl$: %C, 73.6; %H, 7.94; %N, 8.16; and %Cl, 10.3.

*Example II*

Treatment of a small portion of the product of Example I dissolved in water with a concentrated solution of potassium hexafluorophosphate gave an immediate precipitate which was collected by filtration and dried. The resultant 1,1,6 - trimethyl - 3 - ethyl - 4,4 - dephenyl - $\Delta^2$ - tetrahydropyridazinium hexafluorophosphate melted at 155° C. and has the structural formula shown below:

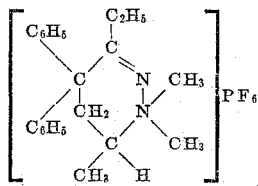

*Example III*

The product of Example I was dissolved in physiological saline at a concentration of 10 mg./ml. and administered to unstarved male albino mice at doses of 50, 100, 125 and 150 mg./kg. The acute intraperitoneal $LD_{50}$ at 48 hours appears to be approximately 125 mg./kg.

*Example IV*

The purpose of this example is to demonstrate the analgesic activity of our novel compounds. Male albino rats were used as the experimental animal in this study and heat generated by an automobile spotlight, operated with a suitable focusing lens, served as the pain stimulus. The heat was focused on the rat's tail and the time required for the animal to respond by a flick of its tail was measured and represents the reaction time.

For purposes of injection, all test compounds were prepared in distilled water and the concentration of each solution adjusted so that all animals received 1.0 ml. of solution per 100 g. of body weight. Reaction times were recorded for each animal one hour prior to intraperitoneal injection of various doses (10 to 50.6 mg./kg.) of the test compounds. Five animals were used per dose of each compound and a 30 minute absorption period was allowed before redetermining the reaction times. The results with 1,1,6-trimethyl-3-ethyl-4,4-diphenyl-$\Delta^2$-tetrahydropyridazinium chloride are tabulated below:

| Dose, mg./kg. | Mean Reaction Time, sec. | |
| --- | --- | --- |
| | Control | Test |
| 10.0 | 11.6 | 10.8 |
| 22.5 | 10.3 | 10.0 |
| 50.6 | 11.4 | 18.8 |

We claim:
1. A process for making $\Delta^2$-tetrahydropyridazinium chlorides having the general formula:

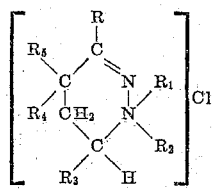

wherein R, $R_1$, $R_2$ and $R_3$ are lower alkyl radicals and $R_4$ and $R_5$ are independently selected from the group consisting of phenyl, lower alkyl phenyl and halo phenyl which comprises contacting chloramine with gamma keto tertiary amines having the general formula $$RCOCR_5R_4CH_2CHR_3NR_2R_1$$

and separating the said $\Delta^2$-tetrahydropyridazinium chlorides thus formed from the reaction mixture.

2. The process according to claim 1 effected in the presence of an unreactive solvent.

3. The process according to claim 2 wherein R, $R_1$, $R_2$ and $R_3$ are lower alkyl and $R_4$ and $R_5$ are phenyl.

4. Compounds having the general formula:

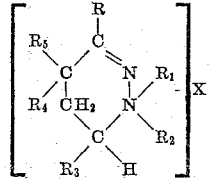

wherein R, $R_1$, $R_2$ and $R_3$ are lower alkyl radicals; $R_4$ and $R_5$ are phenyl; and X is a pharmaceutically acceptable anion.

5. 1,1,6 - Trimethyl - 3 - ethyl - 4,4 - diphenyl - $\Delta^2$-tetrahydropyridazinium chloride.

6. 1,1,6 - Trimethyl - 3 - ethyl - 4,4 - diphenyl - $\Delta^2$-tetrahydropyridazinium hexafluorophosphate.

References Cited in the file of this patent

Levisalles: Compte Rend., vol. 238 (1954), pp. 592–4.
Beranger et al.: Compte Rend., vol. 236 (1953), pp. 1365–7.